(12) United States Patent
Takahashi et al.

(10) Patent No.: US 11,220,293 B2
(45) Date of Patent: Jan. 11, 2022

(54) SUBFRAME STRUCTURE

(71) Applicant: HONDA MOTOR CO., LTD., Tokyo (JP)

(72) Inventors: Hayato Takahashi, Wako (JP); Ryo Ohnaka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 115 days.

(21) Appl. No.: 16/833,924

(22) Filed: Mar. 30, 2020

(65) Prior Publication Data

US 2020/0307699 A1   Oct. 1, 2020

(30) Foreign Application Priority Data

Mar. 29, 2019 (JP) .............................. JP2019-065308

(51) Int. Cl.
*B62D 21/11* (2006.01)
*B62D 21/15* (2006.01)

(52) U.S. Cl.
CPC ............ *B62D 21/11* (2013.01); *B62D 21/155* (2013.01)

(58) Field of Classification Search
CPC ....... B62D 21/00; B62D 21/11; B62D 21/155
See application file for complete search history.

(56) References Cited

U.S. PATENT DOCUMENTS

2017/0197662 A1 * 7/2017 Nakamoto ........... B62D 21/155

FOREIGN PATENT DOCUMENTS

| EP | 1388485 A1 * | 2/2004 | .............. F16F 7/123 |
| JP | 5440318 B2 | 3/2014 | |
| WO | WO-2012060257 A1 * | 5/2012 | ............. B62D 21/11 |
| WO | WO-2012102192 A1 * | 8/2012 | ............. B62D 25/082 |

* cited by examiner

*Primary Examiner* — Lori L Lyjak
(74) *Attorney, Agent, or Firm* — Rankin, Hill & Clark LLP (57) ABSTRACT

A subframe structure includes: a left-right pair of extension members extending in a vehicle front-rear direction and each having a rectangular orthogonal cross section; a rear member connected to rear end portions of the extension members and extending in a vehicle width direction; and connecting parts connecting the rear end portions and the rear member. Each extension member includes: a first weak portion located forwardly of the corresponding connecting part and deformable when a load is applied; and a second weak portion located forwardly of the first weak portion and deformable when a load is applied. The first and second weak portions of each extension member are formed in upper and lower faces thereof, respectively. The orthogonal cross section of each extension member has a height, dimension H1 at the first weak portion and a height dimension H2 at the second weak portion and H1 is smaller than H2.

8 Claims, 6 Drawing Sheets

SUBFRAME STRUCTURE

CROSS-REFERENCE TO RELATED APPLICATIONS

The present application claims priority under 35 U.S.C. § 119 to Japanese Patent Application No. 2019-065308, filed Mar. 29, 2019, the disclosure of which is herein incorporated by reference in its entirety.

BACKGROUND OF THE INVENTION

1. Field of the Invention

The present invention relates to a structure of a subframe arranged below a power plant room located in a forward part of a vehicle.

2. Description of Related Art

For example, Japanese Patent No. 5440318 discloses a vehicle body forward part structure in which a lower member arranged below a front side member and forwardly of a front suspension member is provided with a plurality of weak portions.

According Japanese Patent No. 5440318, the lower member of the vehicle body forward part structure can be bent due to a collision load in the event of a frontal collision, at the plurality of weak portions in order from a rearward weak portion thereof alternately upward and downward, thereby to efficiently absorb the frontal collision load.

SUMMARY OF THE INVENTION

According to the structure disclosed in Japanese Patent No. 5440318, as the rigidity and strength of the lower member having the plurality of weak portions are low, it is difficult to cause the front suspension member to fall off from a vehicle-body-side member. Due to this, in the case of the structure disclosed in Japanese Patent No. 5440318, a drive device (e.g., gearbox and/or stabilizer of an electric power steering device) arranged rearwardly of a power plant may come into contact with a vehicle compartment and cause deformation thereof.

It is conceivable to form a bending point in the subframe such that the subframe is bent at the bending point in the event of a load being applied and thereby the subframe falls off from the vehicle-body-side member. However, a cross member included in the subframe may be bent upward due to the bending point coming into contact with the ground in the event of the load being applied. In this event, members mounted on the cross member included in the subframe may come into contact with the vehicle compartment and cause deformation thereof.

The present invention is made in view of the above-described problem, and it is an object of the present invention to provide a subframe structure having a rear member such that even when a weak portion of the subframe structure is bent in the event of a load being inputted and comes into contact with the ground, it is possible to prevent the rear member from being bent upward and thereby prevent members mounted on the rear member from coming into contact with a vehicle compartment and thereby prevent deformation of the vehicle compartment.

To achieve the above-described object, provided is a subframe structure arranged below a power plant room of a forward part of a vehicle, the subframe structure including: a left-right pair of extension members extending in a vehicle front-rear direction, each of the left-right pair of extension members having a rear end portion and an orthogonal cross section with a generally rectangular shape; a rear member connected to the rear end portions of the left-right pair of extension members and extending in a vehicle width direction; and connecting parts connecting the rear end portions of the left-right, pair of extension members and left-side and right-side front portions of the rear member, respectively. Each of the left-right pair of extension members comprises: a first weak portion located forwardly of the corresponding connecting part and being deformable downward when a load is applied; and a second weak portion located forwardly of the first weak portion and being deformable upward when a load is applied. The first weak portion of each extension member is formed in an upper face thereof. The second weak portion of each extension member is formed in a lower face thereof. The orthogonal cross section of each extension member has a height dimension H1 at the first weak portion of the extension member and a height dimension H2 at the second weak portion of the extension member and H1 is smaller than H2.

The present invention can provide a subframe structure having a rear member such that even when a weak portion of the subframe structure is bent in the event of a load being inputted and comes into contact with the ground, it is possible to prevent the rear member from being bent upward and thereby prevent members mounted on the rear member from coming into contact with a vehicle compartment and thereby prevent deformation of the vehicle compartment.

DETAILED DESCRIPTION OF THE EMBODIMENTS

Next, an embodiment of the present invention will be described in detail with reference to the drawings.

In the drawings, "front-rear", "left-right", and "up-down" directions correspond to the vehicle front-rear direction, left-right direction (vehicle width direction), and vehicle up-down direction (vertically upward-downward direction), respectively.

Figure 1:
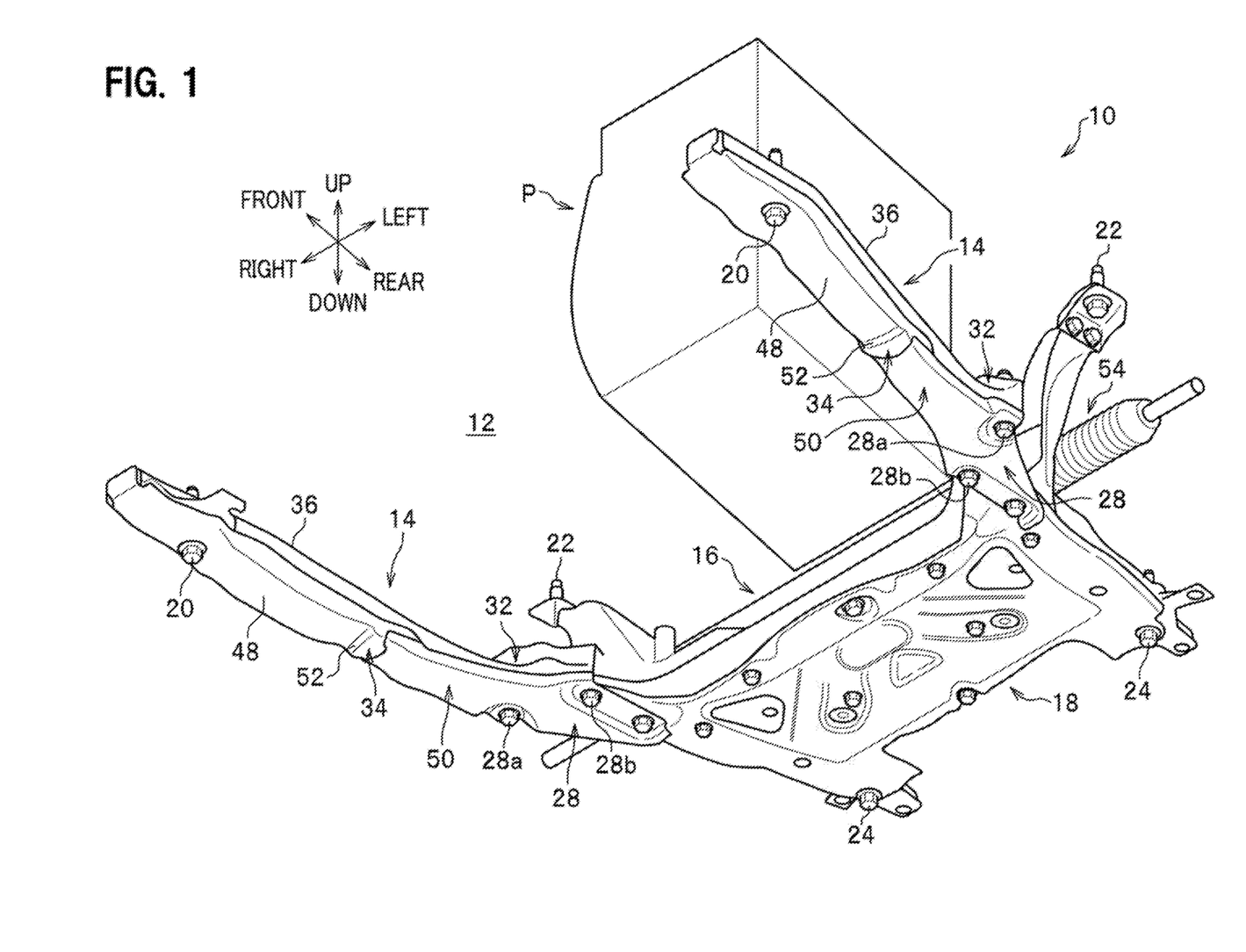
FIG. 1 is a perspective view of a front, subframe to which a subframe structure according to an embodiment of the present invention has been applied, as seen from below ahead of the vehicle.

A front subframe 10 (hereinafter referred to simply as subframe 10) to which a subframe structure according to the embodiment of the present invention is applied is to be arranged in a forward part of a vehicle. As shown in FIG. 1, the subframe 10 is arranged below a power plant room 12 located in the forward part of the vehicle.

The subframe 10 supports front-wheel suspension devices not shown and supports the power plant P, e.g., a drive unit including a motor and/or an engine, via a mount mechanism not shown.

As shown in FIG. 1, the subframe 10 has a left-right pair of extension members 14, a rear member 16, and a reinforcement member 18.

The subframe 10 includes a plurality of vehicle body connection parts to be respectively connected to a plurality of vehicle-body-side members using bolts and nuts. The plurality of vehicle body connection parts are constituted by a left-right pair of front vehicle body connection parts (first vehicle body connection parts) 20, a left-right pair of mid vehicle body connection parts (second vehicle body connection parts) 22, and a left-right pair of rear vehicle body connection parts 24.

The left-right pair of front vehicle body connection parts 20 connect a forward part of the subframe 10 to a front bulkhead (vehicle-body-side member) not shown. The left-right pair of mid vehicle body connection parts 22 connect a vehicle front-rear direction central part of the subframe 10 to front side frames (another vehicle-body-side member) not shown. The left-right pair of rear vehicle body connection parts 24 connect a rearward part of the subframe 10 to, for example, outriggers not shown.

The left-right pair of extension members 14 extends substantially in the vehicle front-rear direction such that a distance between them slightly increases as they extend forward in the vehicle front-rear direction, in plan view. Each of the left-right pair of extension members 14 has an upper wall part 14a with a U-shaped cross section and a lower wall part 14b, which are integrally joined to each other via their flanges. A cross section taken in a plane perpendicular to an axial line (orthogonal cross section) of each of the left-right pair of extension members 14 is a rectangular shaped closed cross section (see FIGS. 4 and 5). The left-right, pair of extension members 14 are each formed of a steel material, for example.

As shown in FIG. 1, the subframe 10 has a left-right, pair of connecting parts 28 by which rear end portions of the left-right pair of extension members 14 and left and right front end portions (left-side and right-side front portions) of the rear member 16 are connected respectively. Each of the connecting parts 28 is constituted by an outer connecting part 28a and an inner connecting part 28b. The outer connecting part 28a is located on a vehicle width direction outer side and the connection is made by a bolt and a nut. The inner connecting part 28b is located on a vehicle width direction inner side, which faces the power plant room 12 in which the power plant P is installed, and the connection is made by a bolt and a nut. The present embodiment is an example in which rear end portions of the left-right pair of extension members 14 are respectively connected to the left and right front end portions (left-side and right-side front portions) of the rear member 16 by the bolts and the nuts. However, embodiments of the present invention are not limited to this example. For example, the left-right pair of extension members 14 and the rear member 16 may be integrally connected (joined) to each other by joining means like welding.

Figure 2:
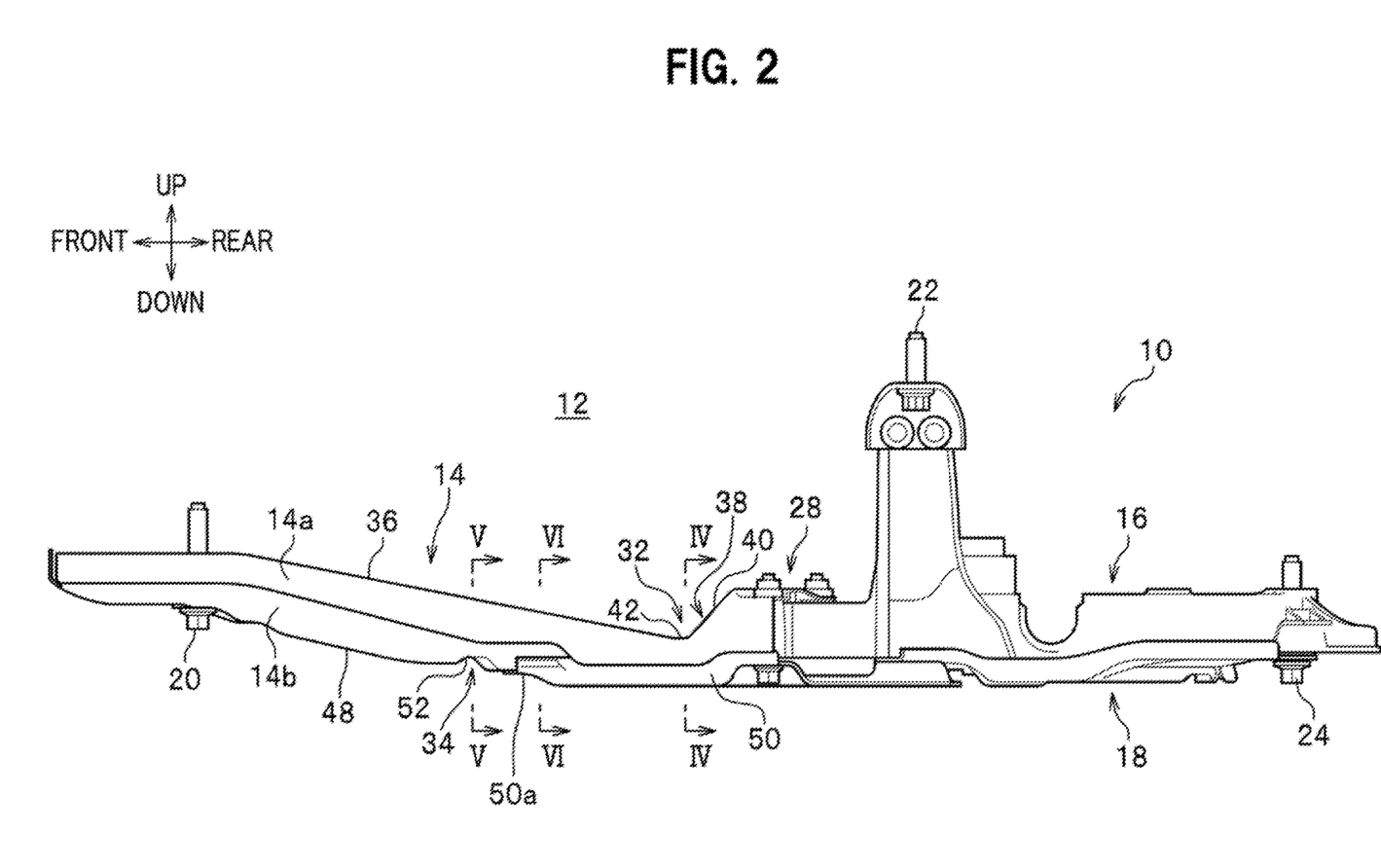
FIG. 2 is a left side view of the front subframe shown in FIG. 1.

As shown in FIG. 2, each of the left-right pair of extension members 14 has a first weak portion 32 and a second weak portion 34 located forwardly of the first weak portion 32. The first weak portion 32 is located forwardly of the corresponding connecting part 28 and is deformable downward when a load is applied. The first weak portion 32 is formed in an upper face of each extension member 14. Each first weak portion 32 is constituted by a dent portion 42 formed in the upper face of the extension member 14. The upper face has a gentle slope surface 36 sloped gradually downward from a forward part of the extension member 14 toward a rearward part thereof and has a steep slope surface 40 of the later-described sloped surface portion 38. The gentle slope surface 36 and the steep slope surface 40 intersect at the dent portion 42. The dent portion 42 extends in the vehicle width direction in the upper face of the extension member 14.

The second weak portion 34 is located forwardly of the first weak portion 32 and is deformable upward when a load is applied. The second weak portion 34 is formed in a lower face of the extension member 14.

Each second weak portion 34 is constituted by a dent portion 52 which is located rearwardly of a gentle slope surface 48 formed in the lower face of the extension member 14 and which is located forwardly of a front end portion of the later-described flat plate part 50 extending forward from a lower face of a corresponding one of the left-right pair of mid vehicle body connection parts 22. The dent portion 52 extends in the vehicle width direction in the lower face of the extension member 14.

Figure 4:
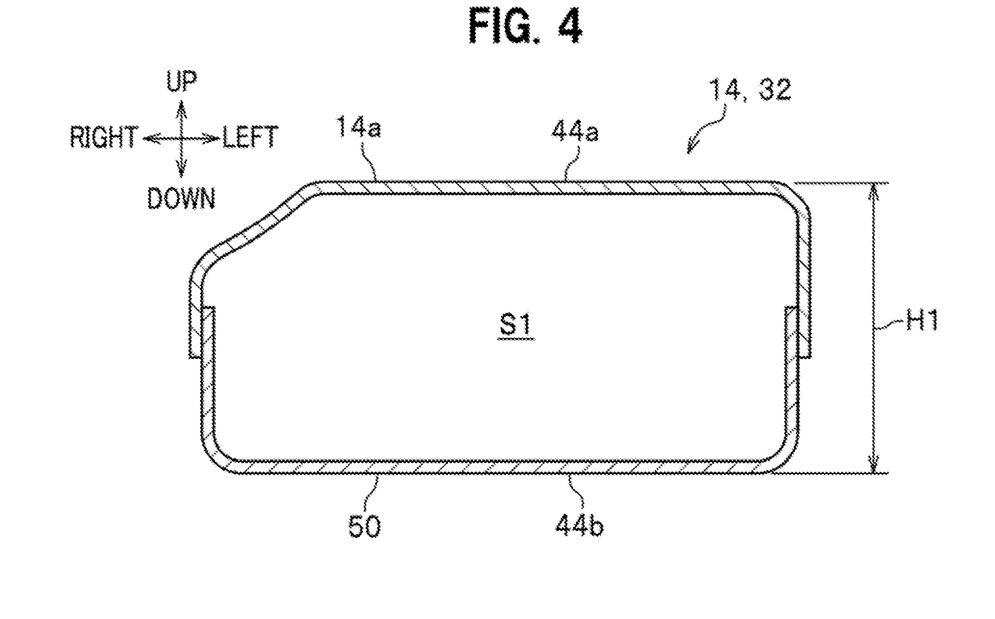
FIG. 4 is an end view taken along line IV-IV of FIG. 2.
Figure 5:
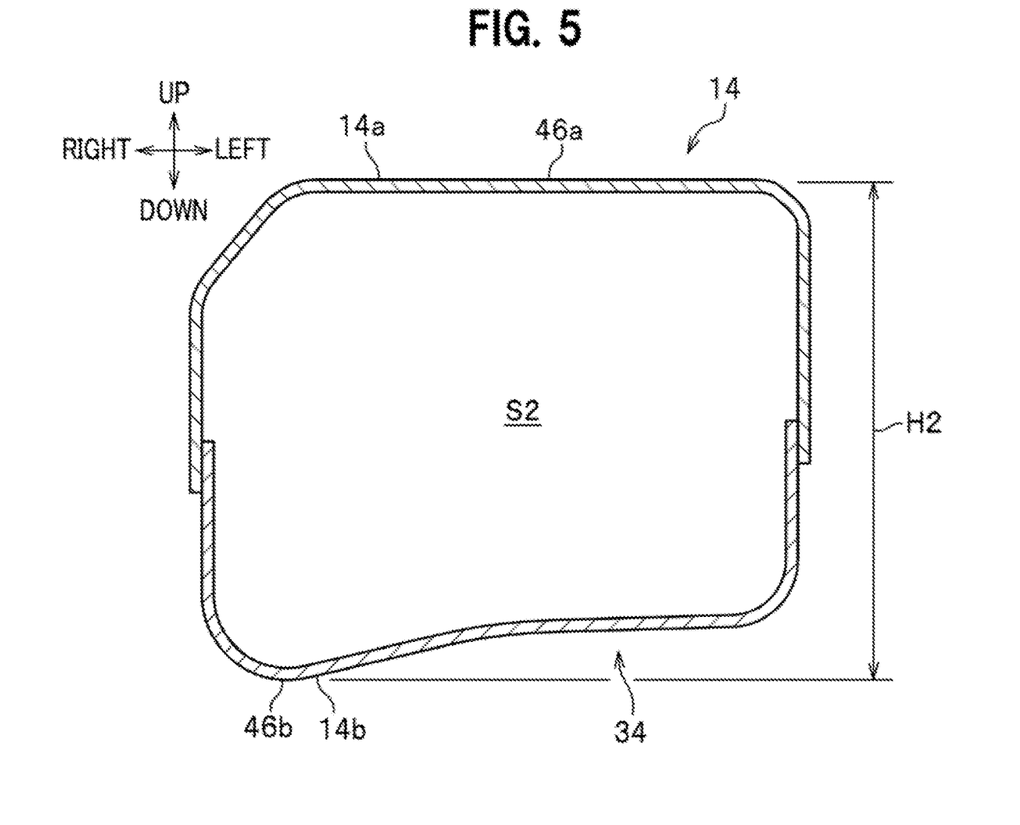
FIG. 5 is an end view taken along line V-V of FIG. 2.

As shown in FIGS. 4 and 5, the height dimension H1 of an orthogonal cross section of the first weak portion 32 is smaller than the height dimension H2 of an orthogonal cross section of the second weak portion 34, i.e., H1<H2. Assuming that each extension member 14 has substantially the same width dimension, setting the height dimension 42 of the orthogonal cross section of the second weak portion 34 larger than the height dimension H1 of the orthogonal cross section of the first weak portion 32 results in the area S2 (see FIG. 5) of the closed cross section of the second weak portion 34 being larger than the area S1 (see FIG. 4) of the closed cross section of the first weak portion 32, i.e., S1<S2. As a result, the rigidity and strength of the second weak portion 34 is set larger than those of the first weak portion 32. In other words, the second weak portion 34 is harder to be deformed than the first weak portion 32 in the event of a load being applied to the extension member 14 from a front side thereof toward a rear side. That is, the first weak portion 32 is likely to get deformed before the second weak portion 34 gets deformed.

The height dimension H1 of the orthogonal cross section of the first weak portion 32 is defined as a maximum separation distance in the up-down direction between an upper face 44a and a lower face 44b of the first weak portion 32, which has a substantially rectangular orthogonal cross section. The height dimension H2 of the orthogonal cross section of the second weak portion 34 is defined as a maximum separation distance in the up-down direction between an upper face 46a and a lower face 46b of the second weak portion 34, which has a substantially rectangular orthogonal cross section.

Each of the left-right pair of front vehicle body connection parts 20, which is coupled to a not-shown front bulkhead, is located in a forward part of a corresponding one of the left-right pair of extension members 14. Each second weak portion 34 is located substantially centrally between the corresponding front vehicle body connection part 20 and the corresponding first weak portion 32.

The upper face of each of the left-right pair of extension members 14 includes a sloped surface portion 38 including a slope surface 40 that rises upward from the corresponding first weak portion 32 to the corresponding connecting part 28. The slope surface 40 of the sloped surface portion 38 is steep and has a large slope compared to the gentle slope surface 36 located forwardly of the first weak portion 32.

The left-right pair of mid vehicle body connection parts 22, connected to the front, side frames not shown, are respectively located rearward of rear ends of the left-right pair of extension members 14. Provided on the lower side of each of the left-right pair of extension members 14 is the flat plate part 50, which extends, in a substantially flat plate shape, integrally with the extension member 14 from the corresponding mid vehicle body connection part 22 to the corresponding second weak portion 34. This flat plate part 50 extends over and integrally connects lower sides of a rear portion of the corresponding extension member 14 and a front portion of the rear member 16.

Figure 3:
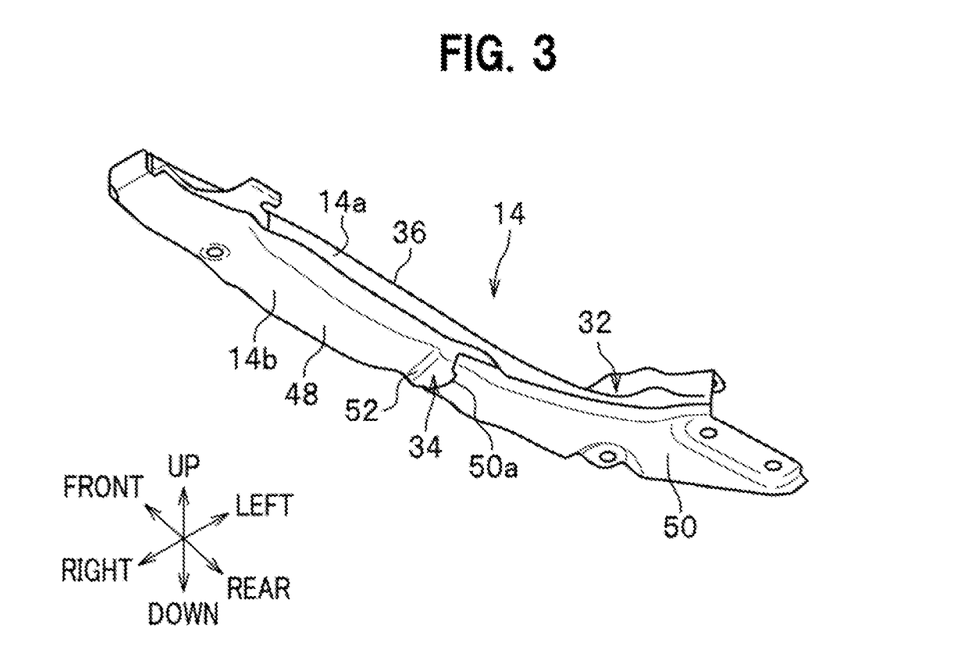
FIG. 3 is a perspective view of an extension member as seen from below.

As shown in FIGS. 2 and 3, the flat plate part 50 is located below the first weak portion 32 and is a separate part from the upper wall part 14a and the lower wall part 14b of the corresponding extension member 14. Forming the flat plate part 50 with a separate part makes it possible to form the upper wall part 14a and the lower wall part 14b of the corresponding extension member 14 with small parts. As a result, it is not necessary to use a large machine in the manufacturing, leading to a decrease in the cost.

Figure 6:
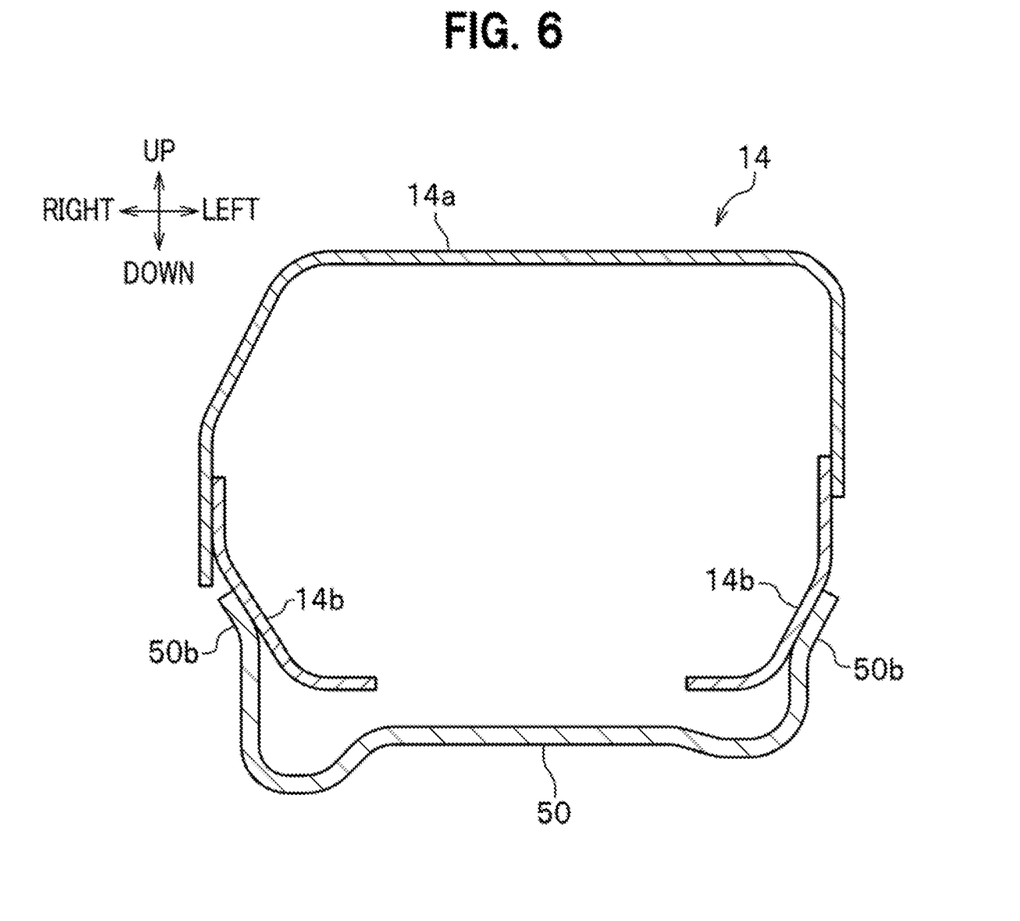
FIG. 6 is an end view taken along line VI-VI of FIG. 2.

The flat plate part 50 has a front end portion 50a extending to a position just rearward of the second weak portion 34. As shown in FIG. 6, the flat plate part 50 has left and right flange portions 50a and 50b via which the flat plate part 50 is joined to side faces of the lower wall part 14b. The flat plate part 50 and the lower wall part 14b form a two-plate structure with a space therebetween at a position located rearward of the second weak portion 34 and provide great rigidity and strength compared to another portion of the extension member 14 to which portion the flat plate part 50 is not joined. As a result, there occurs a difference in the rigidity and strength between the portion to which the flat plate part 50 is joined and the second weak portion 34, to which the flat plate part 50 is not joined. Thus, the second weak portion 34 can be reliably depressed upward and bent.

The rear member 16 is located rearward of the left-right pair of extension members 14 and extends in the vehicle width direction. The rear member 16 has an upper face on which an electric power steering device 54 (see FIG. 1) or the like is mounted. The rear member 16 is formed of a light metal such as aluminum or an aluminum alloy. The rear member 16 has a lower face to which the reinforcement member 18 is connected via a plurality of connection points. The reinforcement member 18 reinforces the rigidity and strength of the rear member 16 formed of the light metal.

The front subframe 10, to which the subframe structure according to the present embodiment is applied, is basically structured as described above. Next, a description will be given of the operational effects of the present embodiment.

FIGS. 7A to 7D are explanatory diagrams for explaining how the extension member 14 gets deformed about the first weak portion 32 and the second weak portion 34 in the event of a frontal collision load being applied. In FIGS. 7A to 7D, reference numeral 100 designates a front side frame, reference numeral 110 designates an upper member, and reference numeral 120 designates a front bulkhead.

Figure 7A:
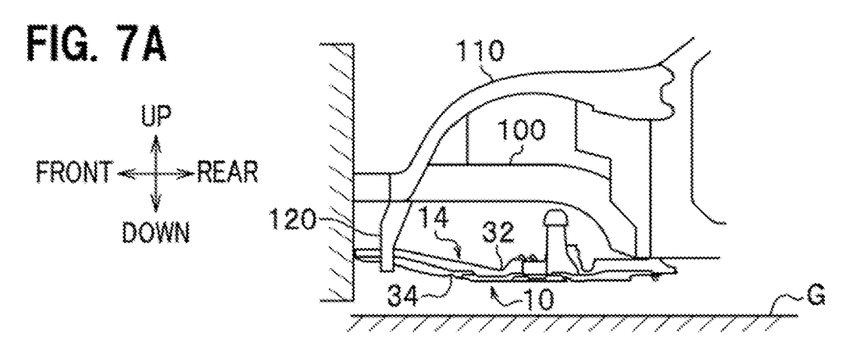
FIGS. 7A to 7D are explanatory diagrams for explaining how the extension member gets deformed about a first weak portion and a second weak portion upon receipt of a frontal collision load.
Figure 7B:
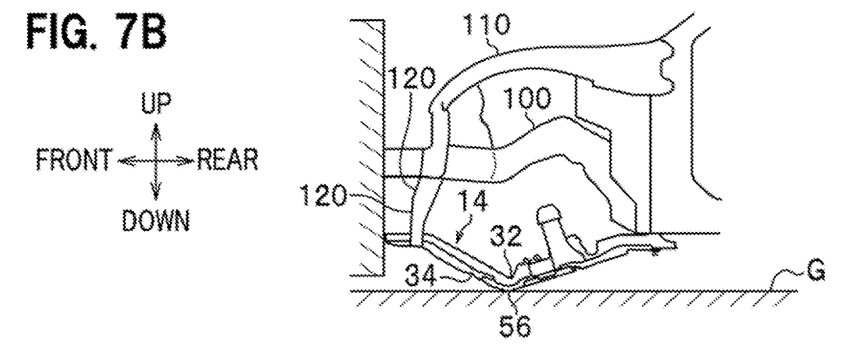

In the event of a frontal collision load (including cases of an offset load) being applied from a front part of the vehicle, the subframe 10 is bent downward (toward the ground G) into a substantially v shape at the first weak portion 32 having smaller rigidity and strength than the second weak portion 34 (see transition from FIG. 7A to FIG. 7B). A substantially V-shaped bent portion 56 of the first weak portion 32 cones into contact with the ground G and receives an upward reaction force from the ground G. This reaction force applied from the ground G causes the extension member 14 to be further bent upward at the second weak portion 34 (see transition from FIG. 7B to FIG. 7C).

Figure 7C:
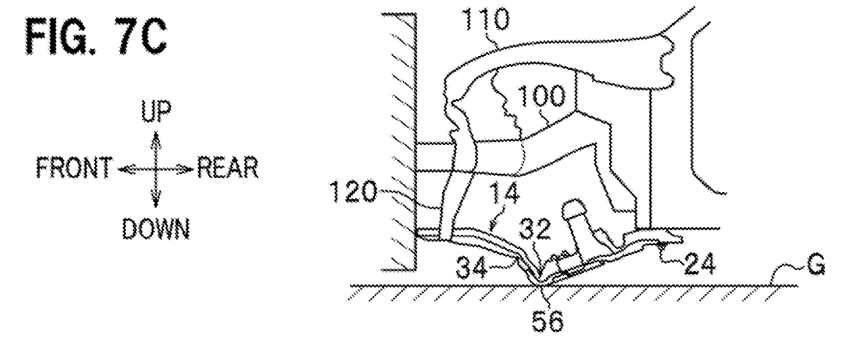
Figure 7D:
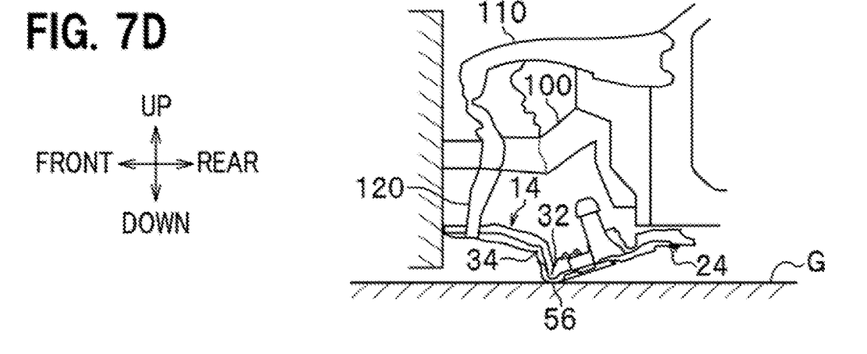

Further, as the frontal collision load increases, the bending deformation of the extension member 14 at the second weak portion 34 increases and the bolt of the rear vehicle body connection part 24 connected to a vehicle-body-side member comes out from the fastening point, resulting in the falling off of the rear member 16 from the vehicle-body-side member (see transition from FIG. 7C to FIG. 7D). In this manner, the present embodiment utilizes the reaction force from the ground G to bend the extension member 14 upward at the second weak portion 34 and downward at the first weak portion 32, resulting in a deformation of the extension member 14 into a Z shape in side view, and causes the bolt of the rear vehicle body connection part 24 connected to the vehicle-body-side member to fall off therefrom.

According to the present embodiment, each extension member 14 is provided with the first weak portion 32 and the second weak portion 34 and thereby the extension member 14 can be bent into a Z shape in side view in the event of a collision load being applied to the extension member 14. With this, even when the bent portion 56 of the extension member 14 cones into contact with the ground G, the present embodiment causes the bolt of the rear vehicle body connection part 24 to fall off from the vehicle-body-side member and thereby prevents a rear portion of the subframe, which rear portion includes the first weak portion 32 and the rear member 16, from being bent upward. As a result, the present embodiment makes it possible to prevent the members mounted on the rear member 16 from coming into contact with a vehicle compartment and thereby prevent the vehicle compartment from getting deformed, in the event of a frontal collision load being applied.

In addition, the present embodiment allows absorption of the collision load by the deformation of the second weak portion 34 and thus restrains the load inputted to the vehicle body.

Moreover, as the extension member 14 is thicker at the second weak portion 34 than at the first weak portion 32 (compare FIG. 4 and FIG. 5), it is possible to prevent the second weak portion 34 from getting deformed before the first weak portion 32 gets deformed in the event of a collision load being applied.

Moreover, with the structure of the present embodiment, the collision load is transmitted to the rear vehicle body connection part 24 of the rear member 16. This makes it possible to cause the bolt of the rear vehicle body connection part 24 to fall off from the vehicle-body-side member.

Moreover, according to the present embodiment, the second weak portion 34 is located substantially centrally between the corresponding front vehicle body connection part 20 and the corresponding first weak portion 32. This structure allows the stroke of deformation of the second weak portion 34 and suitably absorbs the collision load and avoids the upward bending deformation of the rear member 16.

Moreover, according to the present embodiment, the flat plate part 50 extending from the mid vehicle body connection part 22 to the second weak portion 34 is provided on the lower side of the extension member 14. This structure produces a difference in the rigidity and strength between the second weak portion 34 and the flat plate part 50, and thus makes it possible to reliably cause the second weak portion 34 to get deformed upward by utilizing the reaction force received when the first weak portion 32 comes into contact with the ground G.

Moreover, according to the present embodiment, the upper face of each of the left-right pair of extension members 14 includes the sloped surface portion 38 extending from the corresponding first weak portion 32 to the rear member 16. This structure produces a difference in the rigidity and strength between the first weak portion 32 and the sloped surface portion 38 and thus makes it possible to reliably cause the first weak portion 32 to get deformed downward.

What is claimed is:

1. A subframe structure arranged below a power plant room of a forward part of a vehicle, the subframe structure comprising:
    a left-right pair of extension members extending in a vehicle front-rear direction, each of the left-right pair of extension members having a rear end portion and an orthogonal cross section with a generally rectangular shape;
    a rear member connected to the rear end portions of the left-right pair of extension members and extending in a vehicle width direction; and
    connecting parts connecting the rear end portions of the left-right pair of extension members and left-side and right-side front portions of the rear member, respectively,
    wherein each of the left-right pair of extension members comprises:
    a first weak portion located forwardly of the corresponding connecting part and being deformable downward when a load is applied; and
    a second weak portion located forwardly of the first weak portion and being deformable upward when a load is applied,
    wherein the first weak portion of each extension member is formed in an upper face thereof,
    wherein the second weak portion of each extension member is formed in a lower face thereof, and
    wherein the orthogonal cross section of each extension member has a height dimension H1 at the first weak portion of the extension member and a height dimension H2 at the second weak portion of the extension member and H1 is smaller than H2.

2. The subframe structure according to claim 1,
    wherein each of the left-right pair of extension members has a front part with a first vehicle body connection part to be connected to a vehicle-body-side member, and
    wherein the second weak portion of each of the left-right pair of extension members is located substantially centrally between the corresponding first vehicle body connection part and the corresponding first weak portion.

3. The subframe structure according to claim 1,
    wherein the subframe structure further comprises second vehicle body connection parts each of which is located rearward of a corresponding one of the left-right pair of extension members and is to be connected to another vehicle-body-side member, and
    wherein each of the left-right pair of extension members has a flat plate part extending in a substantially flat plate shape from the corresponding second vehicle body connection part, to the corresponding second weak portion of the extension member.

4. The subframe structure according to claim 2,
    wherein the subframe structure further comprises second vehicle body connection parts each of which is located rearward of a corresponding one of the left-right pair of extension members and is to be connected to another vehicle-body-side member, and
    wherein each of the left-right pair of extension members has a flat plate part extending in a substantially flat plate shape from the corresponding second vehicle body connection part to the corresponding second weak portion of the extension member.

5. The subframe structure according to claim 1,
    wherein each of the left-right pair of extension members has a sloped surface portion including a sloped surface that rises upward from the first weak portion of the extension member to the corresponding connecting part.

6. The subframe structure according to claim 2,
    wherein each of the left-right pair of extension members has a sloped surface portion including a sloped surface that rises upward from the first weak portion of the extension member to the corresponding connecting part.

7. The subframe structure according to claim 3,
    wherein each of the left-right pair of extension members has a sloped surface portion including a sloped surface that rises upward from the first weak portion of the extension member to the corresponding connecting part.

8. The subframe structure according to claim 4,
    wherein each of the left-right pair of extension members has a sloped surface portion including a sloped surface that rises upward from the first weak portion of the extension member to the corresponding connecting part.

* * * * *